US005421997A

United States Patent [19]

Gerteis

[11] Patent Number: 5,421,997

[45] Date of Patent: Jun. 6, 1995

[54] SLEEVE FILTER CENTRIFUGE

[75] Inventor: Hans Gerteis, Bietigheim-Bissingen, Germany

[73] Assignee: Heinkel Industriezentrifugen GmbH & Co. KG, Bietigheim-Bissingen, Germany

[21] Appl. No.: 39,463

[22] PCT Filed: May 4, 1991

[86] PCT No.: PCT/EP91/00849

§ 371 Date: Jul. 7, 1993

§ 102(e) Date: Jul. 7, 1993

[87] PCT Pub. No.: WO92/19381

PCT Pub. Date: Nov. 12, 1992

[51] Int. Cl.[6] .......................... B01D 33/067; B04B 3/02

[52] U.S. Cl. .......................................... 210/90; 210/350; 210/370; 210/380.3; 210/784; 494/36; 494/38; 494/41

[58] Field of Search ........................ 210/370, 380.3, 90, 210/781, 784, 350; 494/36, 38, 39, 40, 41

[56] References Cited

U.S. PATENT DOCUMENTS 3,438,500 4/1969 Pico .
3,623,613 11/1971 Quetsch .
4,193,874 3/1980 Gerteis .
4,269,711 5/1981 Gerteis .
4,533,472 8/1985 Verri .
4,702,831 10/1987 Gerteis .
4,707,256 11/1987 Gerteis .
4,808,308 2/1989 Flory .
4,915,851 4/1990 Flory .
4,944,874 7/1990 Kobayashi .
5,004,540 4/1991 Hendricks .
5,092,995 3/1992 Gerteis .
5,139,665 8/1992 Gerteis .
5,169,525 12/1992 Gerteis .
5,244,567 9/1993 Gerteis .
5,258,128 11/1993 Gerteis .
5,277,804 1/1994 Gerteis .
5,286,378 2/1994 Gerteis .
5,304,306 4/1994 Gerteis .

FOREIGN PATENT DOCUMENTS 2709894 5/1981 Germany .

*Primary Examiner*—Thomas M. Lithgow
*Attorney, Agent, or Firm*—Shenier & O'Connor

[57] ABSTRACT

A sleeve filter centrifuge comprises between the closed end wall of a centrifugal drum and a base portion movable relative to this end wall a flexible, extendible dividing wall, for example in the form of a bellows or a folded membrane. This dividing wall provides a seal between a displacing shaft bearing the base portion and the inner chamber of the centrifugal drum accommodating the suspension and prevents any exchange of substances, which, for example, impairs sterilization, between the process area of the centrifugal drum and the machine frame side of the sleeve filter centrifuge.

6 Claims, 4 Drawing Sheets

SLEEVE FILTER CENTRIFUGE

The invention relates to a sleeve filter centrifuge according to the preamble to patent claim 1.

Sleeve filter centrifuges of this type are known, for example, from DE-27 09 894 C3.

In the known sleeve filter centrifuge, the displacing shaft penetrates the inner chamber of the centrifugal drum when the drum is opened and can hereby transfer impurities, e.g. lubricants, from the machine frame of the centrifugal drum into its inner chamber. In the reverse case, when the centrifugal drum is closed, residual suspension can be introduced into the machine housing by the displacing shaft. These are both disadvantages since the impurities can impair the sterilization of the inner chamber of the drum, which is required for the treatment of sensitive suspensions, for example foods or pharmaceuticals, while residual suspension which reaches the machine frame can interfere with the centrifugal operation, in particular the movement of the displacing shaft.

The object of the invention is to remedy the deficiencies described and to design a sleeve filter centrifuge of the generic type such that the inner chamber of the centrifugal drum which accommodates the suspension is insulated relative to the machine frame side with respect to the transfer of solid, liquid and gaseous substances.

The object is accomplished in accordance with the invention by the characterizing features of patent claim 1.

The following description of preferred embodiments of the invention serves to explain the invention in greater detail in conjunction with the attached drawings. In the drawings.

Figure 1:
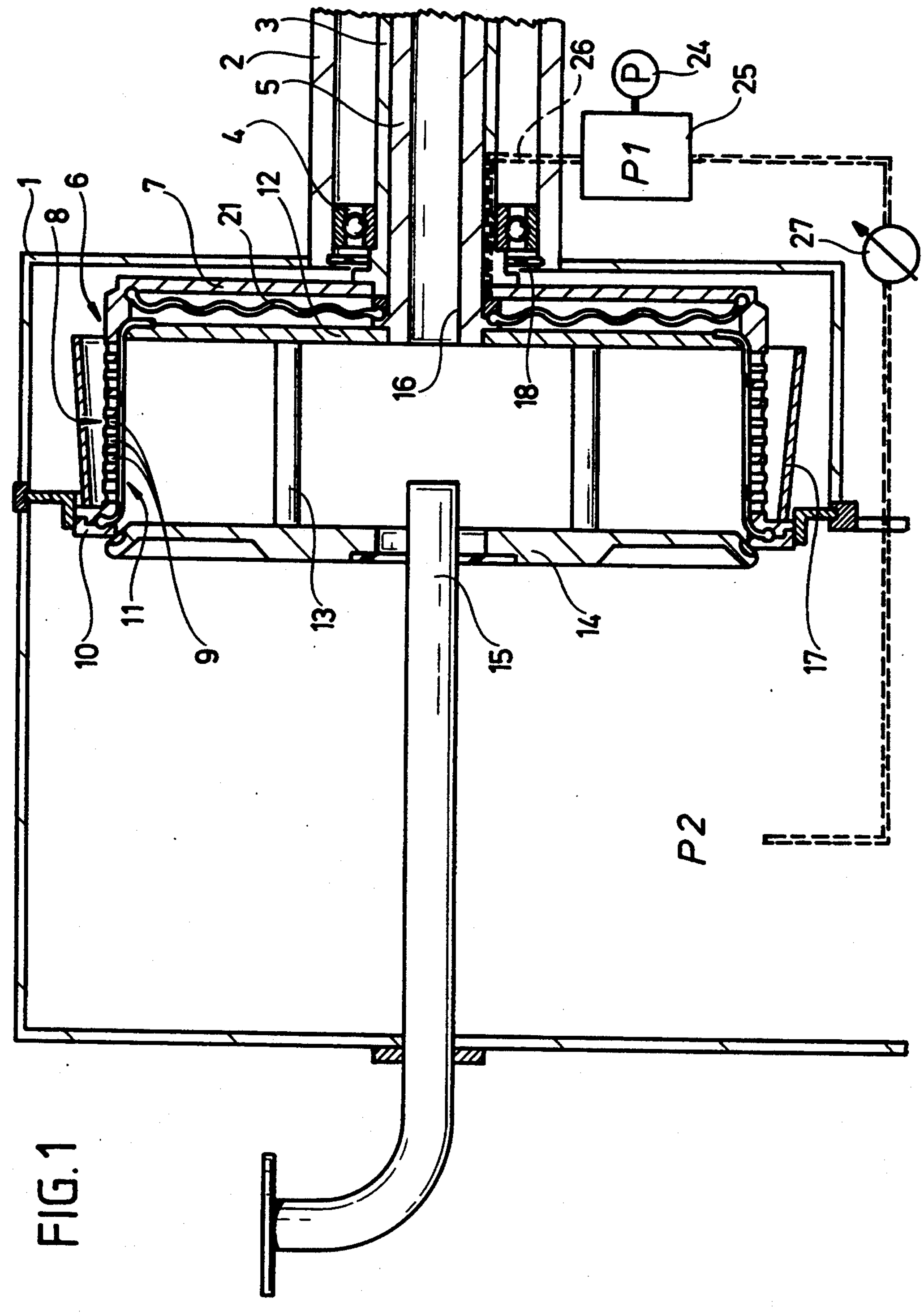
FIG. 1 is a schematic and cut-off illustration of a sleeve filter centrifuge with dividing wall in the closed state of the centrifugal drum.
Figure 2:
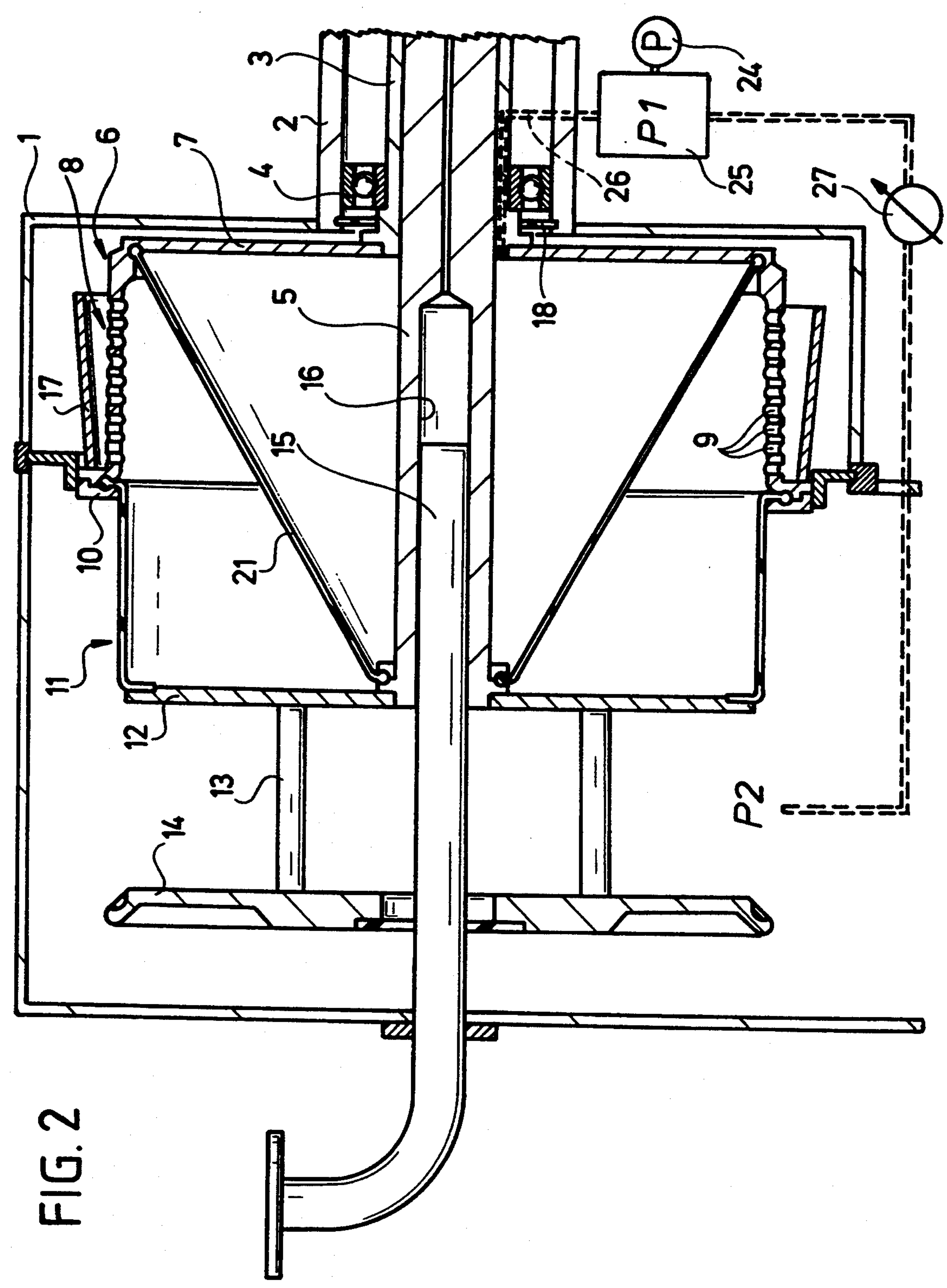
FIG. 2 shows the sleeve filter centrifuge of FIG. 1 with the centrifugal drum open.

The sleeve filter centrifuge illustrated in FIGS. 1 and 2 comprises a housing 1, in which a hollow shaft 3 is rotatably mounted on a stationary machine frame 2 by a roller bearing 4. At least one additional roller bearing is located on the side of the machine frame 2 which is to the right in FIG. 1 and is no longer illustrated. The hollow shaft 3 is caused to rotate with the aid of drive means (located to the right in FIG. 2 and also not illustrated).

A displacing shaft 5 is guided for sliding displacement in the hollow shaft 3, whereby care is taken, e.g. by means of a wedge-groove connection, that the shaft 5 rotates simultaneously with the hollow shaft 3 despite its displaceability relative to this hollow shaft, i.e. is non-rotatingly coupled to the latter. Drive means (not illustrated), which move the displacing shaft 5 axially back and forth as required, are associated with this displacing shaft.

In the housing 1, a bowl-shaped centrifugal drum 6 is non-rotatingly and self-supportingly flange-mounted on the end of the hollow shaft 3 which is located to the left in FIGS. 1 and 2 and protrudes beyond the bearing 4, and such that an end wall 7 which closes the centrifugal drum 6 at its one end face (to the right in FIG. 1) is rigidly connected with the hollow shaft 3. The drum 6 has radially extending filtrate passages 9 in its cylindrical side wall 8. The centrifugal drum 6 is open at its end face opposite the end wall 7.

The one edge of a filter cloth 11 substantially cylindrical-tubular in design is sealingly clamped at the edge 10 of the opening surrounding the open end face of the centrifugal drum 6. The other edge of the filter cloth 11 is sealingly connected in a corresponding manner with a base portion 12 which, for its part, is rigidly connected with the displacing shaft 5. A drum lid 14 is rigidly attached to the base portion 12 via spacer bolts 13, leaving a space free therebetween. In FIG. 1, the lid sealingly closes the inner chamber of the drum 6 by engaging on the edge 10 of its opening and, in FIG. 2, is lifted away from the centrifugal drum 6 together with the base portion 12 by axial outward displacement of the displacing shaft 5 out of the hollow shaft 3.

A feed pipe 15 is rigidly arranged on the housing 1 at the front end of the sleeve filter centrifuge located to the left in FIGS. 1 and 2. This pipe serves to supply a suspension to be separated into its solid and liquid components to the inner chamber of the centrifugal drum 6 (FIG. 1) and in the operative state of the sleeve filter centrifuge illustrated in FIG. 2 it penetrates into a bore 16 of the displaceable shaft 5.

As shown in the drawings, the housing 1 is sealingly connected with the machine frame 2 behind the centrifugal drum 6. In addition, a ring seal 18 arranged in front of the roller bearing 4 seals the machine frame 2 in the direction towards the centrifugal drum 6. In this way, the housing communicating with the inner chamber of the centrifugal drum 6 is sealingly separated from the machine frame 2.

During operation, the sleeve filter centrifuge first takes up the position shown in FIG. 1. The displacing shaft 5 is withdrawn into the hollow shaft 3 by corresponding control of the drive means associated therewith, whereby the base portion 12 rigidly connected with the displacing shaft is located in the vicinity of the closed end wall 7 of the centrifugal drum 6 and the filter cloth 11 is turned into the drum 6 in such a way that it engages on the inner side of the cylindrical side wall of the drum. The drum lid 14 hereby engages sealingly on the edge of the opening of the centrifugal drum 6. When the centrifugal drum is rotated rapidly, for example at a speed of 2000 revs/min, suspension to be filtered is continuously introduced into the inner chamber of the centrifugal drum 6 via the feed pipe 15. The liquid components of the suspension pass in the known manner through the filter cloth 11 and the radial filtrate passages 9 and are diverted by a screen 17. The solid particles of the suspension are retained by the filter cloth 11 as firmly adhering filter cake.

When the centrifugal drum rotates slowly (for example, 500 revs/min), the displacing shaft 5 is advanced to the left (FIG. 2) after filtration has been carried out and the supply of suspension interrupted, whereby the filter cloth 11 is turned outwards so that the solid particles adhering thereto as filter cake are catapulted outwards into the housing 1, from where they are conveyed away. Once the removal of the solid particles has terminated, the sleeve filter centrifuge is returned to the operating position according to FIG. 1 by moving the displacing shaft 5 back.

During the transition of the sleeve filter centrifuge from the operating state according to FIG. 1 into that according to FIG. 2, the displacing shaft 5, as shown in FIG. 2, penetrates the inner chamber of the centrifugal drum 6. When the inner chamber of the centrifugal drum 6 has to be kept sterilized and free of germs during the filtration of sensitive products, for example, foods or pharmaceuticals, soiled substances, e.g. lubricants, adhering to the outer side of the displacing shaft 5 can be passed into the centrifugal inner chamber from the side of the machine frame 2 when the centrifugal drum is opened and contaminate the inner chamber. In this case, a renewed sterilization of the inner chamber of the centrifugal drum would be necessary after every opening and reclosing of the centrifugal drum. In the reverse case, remaining components of the suspension can be deposited on the outer side of the displacing shaft 5 when the centrifugal drum 6 is opened and from there pass to the hollow shaft 3 mounted in the machine frame 2. This can lead to problems, in particular with respect to the displaceability of the shaft 5 in the shaft 3.

In order to prevent any undesired transfer of substances in solid, liquid or gaseous form between the inner chamber of the centrifugal drum 6 serving to perform the filtering process and the machine frame 2, these two areas are separated from one another by a dividing wall. In the embodiment according to FIGS. 1 and 2, this dividing wall is designed as an essentially circular-cylindrical folded membrane 21 which is disk-shaped in the normal state and is connected with its outer edge to the outer edge of the end wall 7. An inner edge of the folded membrane 21 enclosing a central opening is connected to the displacing shaft 5 in the immediate vicinity of the base portion 12. The folded membrane has in the normal (unstressed) state according to FIG. 1, i.e. when the centrifugal drum 6 is closed, a substantially plane form, whereby undulations extending concentrically to one another are present in the plane of the membrane. When the centrifugal drum 6 is opened, i.e. during forward displacement of the base portion 12 by the displacing shaft 5 relative to the closed end wall 7 (FIG. 2), the folded membrane 21 extends into a conical configuration, whereby the undulations of the membrane according to FIG. 1 are smoothed out. The folded membrane 21 consists of a flexible, elastically extendible and tensile material, for example rubber.

As shown, in particular, in FIG. 2, the folded membrane 21 provides a sealing dividing wall between the displacing shaft 5 bearing the base portion 12 and the inner chamber of the centrifugal drum accommodating the suspension so that this inner chamber of the drum is separated from the side of the machine frame 2 such that any exchange of substances is ruled out.

Figure 3:
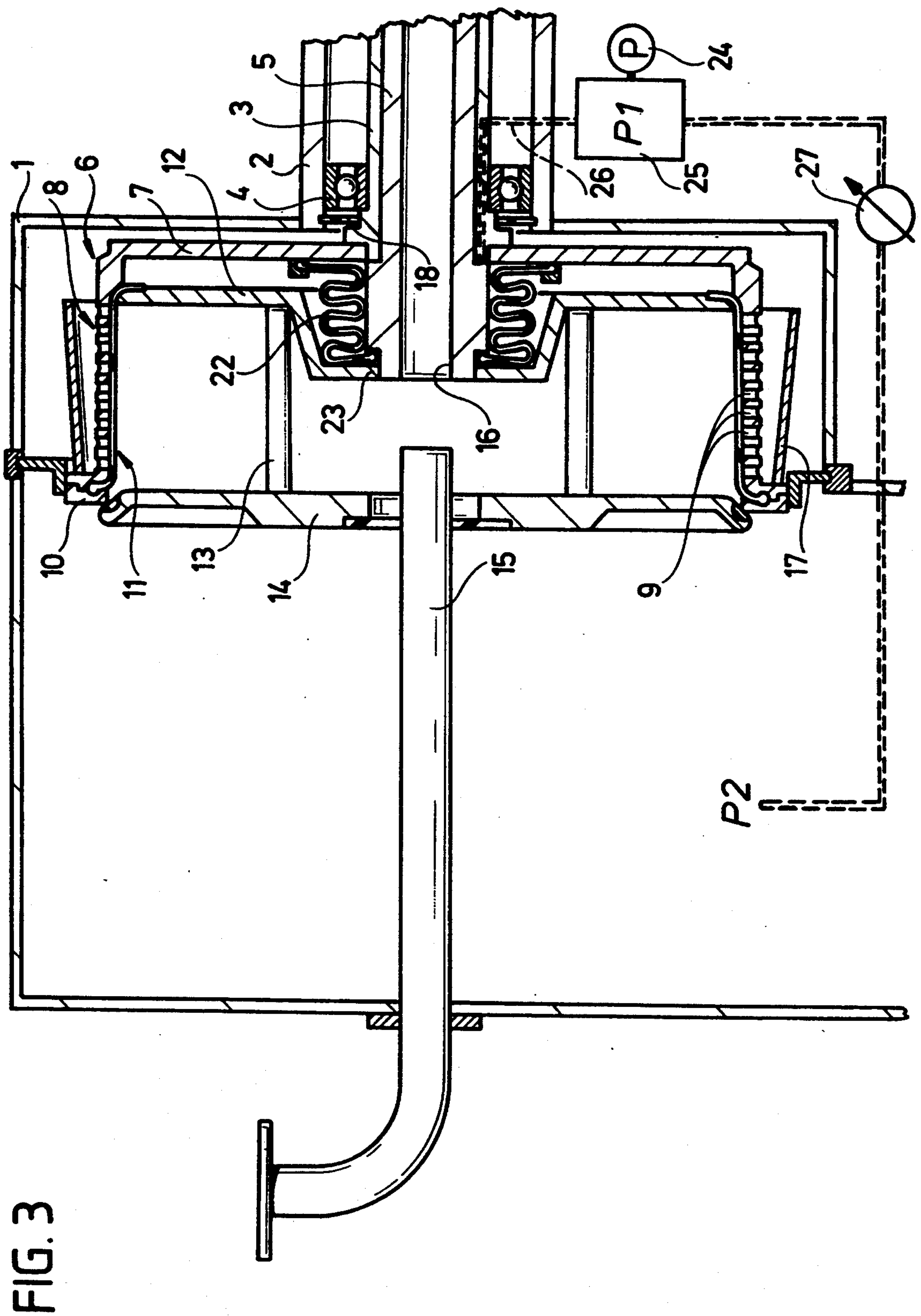
FIG. 3 shows a sleeve filter centrifuge similar to FIG. 1 with a modified dividing wall and FIG. 4 shows the sleeve filter centrifuge of FIG. 3 with the centrifugal drum open.
Figure 4:
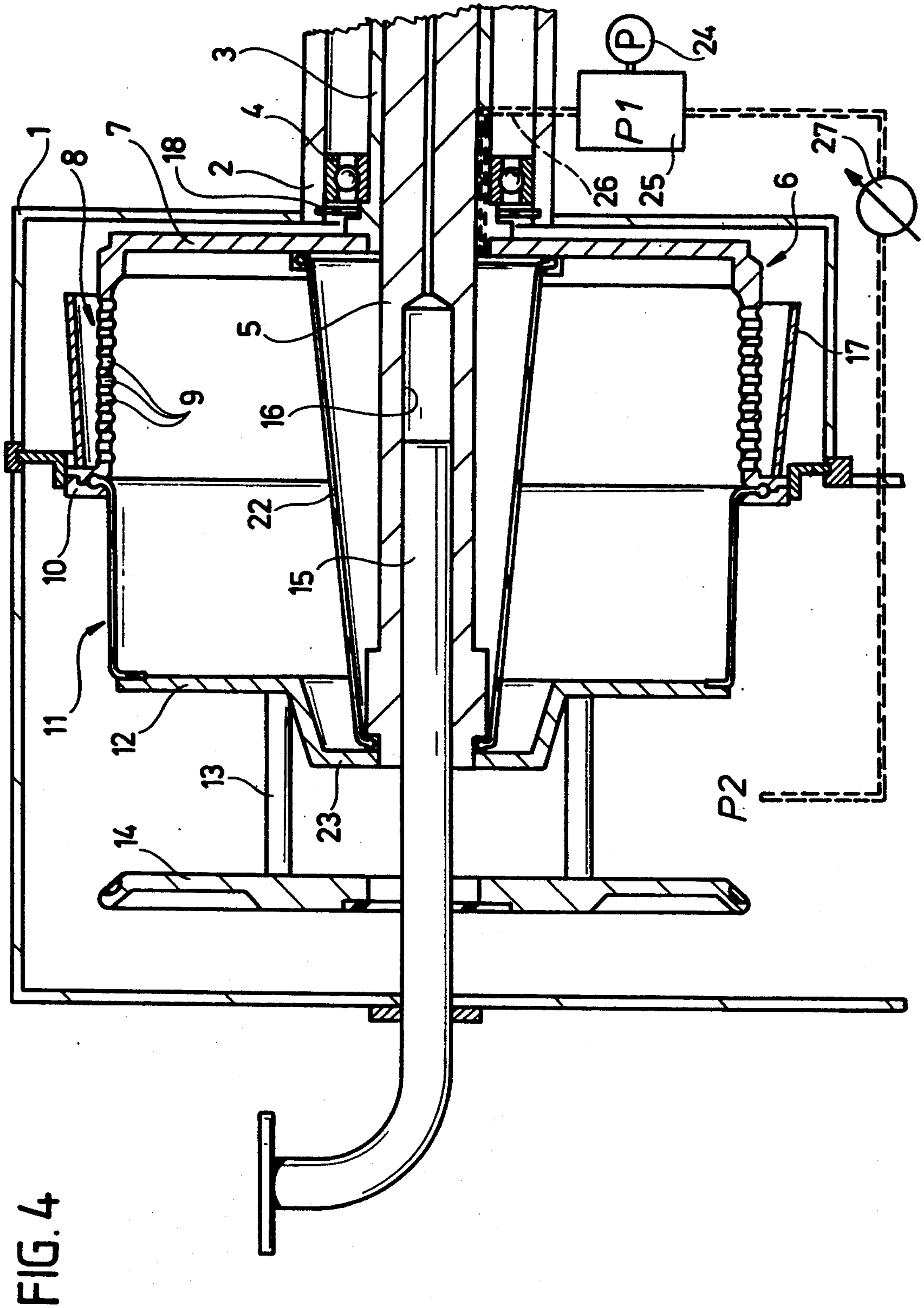

The sleeve filter centrifuge illustrated in FIGS. 3 and 4 differs from the sleeve filter centrifuge according to FIGS. 1 and 2 only in that a customary bellows 22 is provided as dividing wall in FIGS. 3 and 4. One side of these bellows is connected with the closed end wall 7 and the other side with the base portion 12, whereby this base portion 12 has a corresponding bulge 23 to accommodate the bellows when pushed together (FIG. 3). In the opened state of the centrifugal drum 6 (FIG. 4) the extended bellows 22 separates the inner chamber of the centrifugal drum 6 from the displacing shaft 5 in the same manner as the folded membrane 21 in FIGS. 1 and 2.

The dividing wall designed in the form of the folded membrane 21 or the bellows 22 can have a differential pressure monitoring device associated with it, which monitors the dividing wall for leakages. As illustrated in the drawings, an overpressure or underpressure P1 is generated with the aid of a pump 24 in a closed chamber 25. The chamber 25 is, as shown, in particular, in FIGS. 2 and 4, connected via a line 26 with the side of the dividing wall (folded membrane 21 or bellows 22) facing the machine frame 2 and the displacing shaft 5 so that the pressure P1 also prevails in this area. On the opposite side of the dividing wall which faces the inner chamber of the centrifugal drum 6, the pressure P2, for example atmospheric pressure, prevails. A measuring instrument 27 serves to monitor the difference in pressure P2–P1. As soon as the measured value deviates from a predetermined value, a signal is triggered and/or the operation of the sleeve filter centrifuge is stopped because this deviation in the difference in pressure suggests a leakage in the dividing wall (folded membrane 21, bellows 22).

In the embodiments described, the folded membrane 21 acting as dividing wall and the bellows 22 serving the same purpose are designed as flexible, extendible elements. Their extendibility is not absolutely necessary, for example, when the dividing wall is designed as a flexible, non-extendible cloth which is laid or folded together in the closed state of the drum.

The undulations or folds in the folded membrane 21 or a bellows 22 can also be omitted. These elements can, therefore, be smooth in design when the required extendibility results solely from the elastic properties of the material, of which the element consists. Instead of a folded membrane, a flat membrane, which is more or less plane in the inoperative state, can, in particular, be used.

I claim:

1. Sleeve filter centrifuge comprising a centrifugal drum (6) self-supportingly mounted in a machine frame (2) for rotation about an axis and having radial filtrate passages, said drum being closed on one side by an end wall (7) and having an opposite open end having a face with an edge rigidly connected thereto thereby defining an inner chamber, said drum accommodating a suspension to be separated in its interior, a drum lid (14) closing the opposite open end face of the centrifugal drum, wherein centrifugal drum and drum lid are axially displaceable relative to one another, a feed pipe (15) penetrating a feed opening of the drum lid for supplying suspensions to the inner chamber of the centrifugal drum, a base portion (12) rigidly connected with the drum lid while leaving a space free therebetween, a tubular filter cloth (11) attached on one side to the edge of the open drum end face and on the other side to the base portion, a displacing shaft (5) guided for sliding displacement coaxially to the centrifugal drum and bearing the drum lid and the base portion at its one end for the opening and closing of the centrifugal drum and the inversion of the filter cloth associated therewith, wherein the displacing shaft is guided for sliding displacement in a hollow shaft (3) rigidly connected with the closed end face of the centrifugal drum, and drive means for the rotating drive of the centrifugal drum and for the displacement of the displacing shaft relative to the hollow shaft, said centrifuge further comprising a flexible and/or extendible dividing wall (21, 22) which is connected between the closed end wall (7) of the centrifugal drum (6) and the base portion (12) movable relative thereto, said dividing wall providing a seal between the displacing shaft (5) bearing the base portion and the inner chamber of the centrifugal drum accommodating the suspension.

2. Sleeve filter centrifuge as defined in claim 1, in which the dividing wall is designed as a bellows (22) encircling the displacing shaft (5) and being attached on the one hand to the closed end wall (7) and on the other hand to the base portion (12).

3. Sleeve filter centrifuge as defined in claim 1, in which the dividing wall is designed as a folded membrane (21) or a flat membrane connected on the one hand with the closed end wall (7) and on the other hand with the base portion (12) and being extendible from a substantially plane configuration into a conical configuration.

4. Sleeve filter centrifuge as defined in claim 1, comprising a device (27) for monitoring the difference in pressure between the pressures prevailing on both sides of the dividing wall (21, 22).

5. Sleeve filter centrifuge as defined in claim 2, comprising a device (27) for monitoring the difference in pressure between the pressures prevailing on both sides of the dividing wall (21, 22).

6. Sleeve filter centrifuge as defined in claim 3, comprising a device (27) for monitoring the difference in pressure between the pressures prevailing on both sides of the dividing wall (21, 22).

* * * * *